FORWARD BIASED PHOTOTRANSISTOR WITH EXPOSED BASE

Filed Nov. 14, 1966

INVENTOR.
ROY P. FOERSTER

United States Patent Office 3,465,158
Patented Sept. 2, 1969

3,465,158

FORWARD BIASED PHOTOTRANSISTOR WITH EXPOSED BASE

Roy P. Foerster, Thousand Oaks, Calif, assignor to The Bunker-Ramo Corporation, Canoga Park, Calif., a corporation of Delaware Filed Nov. 14, 1966, Ser. No. 594,064
Int. Cl. H01j 39/12
U.S. Cl. 250—211 6 Claims

ABSTRACT OF THE DISCLOSURE

A "light pen" useful in combination with a cathode ray tube display device for enabling an operator to identify a particular displayed symbol by responding to the light produced by the beam forming that symbol. The light pen utilizes a phototransistor positioned therein so that the light to be detected is incident on the transistor base. In order for the phototransistor to have a sufficiently fast response, it is electrically forward biased to a moderate current level. A phototransistor is connected in a circuit which has a high AC gain and a low DC gain. As a consequence, the phototransistor is able to distinguish between a transient light signal (as would be caused by detection of the beam light) and ambient conditions.

Figure 1:
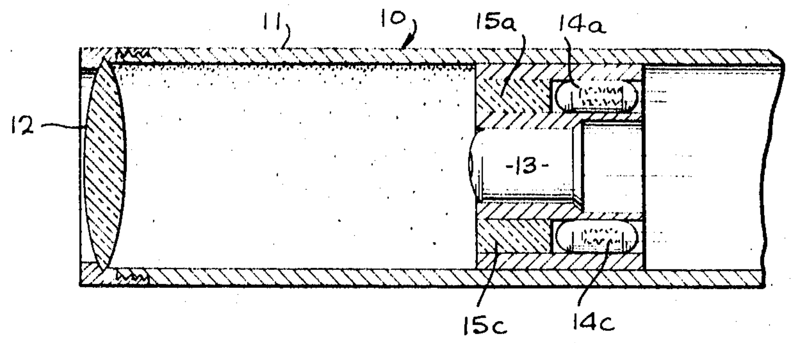

The present invention relates to a light-sensitive apparatus suitable for use as a "light pen."

A light pen is a device which can be used in conjunction with display devices such as cathode ray tube display devices, which are employed for presenting visual representations of data. More particularly, display devices of this type are responsive to data, as, for example, is provided by a computer, for visually representing alphanumeric characters, graphs, arbitrary symbols, etc. It is desirable to provide an operator of such a display device with the capability of selectively identifying any particular portion or symbol of the display. For this purpose, modern display devices are often provided with light pens which permit the operator to manually point the pen at a displayed symbol, for example, to identify it. Once the symbol is identified, it can be operated upon to, for example, modify or delete it.

Most cathode ray tubes have a relatively short persistence, and, as a consequence, the visual display must be periodically refreshed, by cyclically providing the data to be represented thereto. The light pen operates to identify a particular displayed symbol, for example, by sensing the impingement of the cathode ray beam light forming that symbol on a light-sensitive element carried in the pen. It is desirable that the light-sensitive element respond by immediately producing an output pulse which can be coupled back to the data source, for example, the computer, to identify the data corresponding to the selected symbol. Hence, the function of the light pen is to enable an operator, by simply directing a pen-shaped device to the display itself, to change that display without having to worry about such questions as to where in a computer memory the data corresponding to a selected displayed symbol might be located.

In the construction of such light pens, the necessity for speed has led to the utilization of electron multipliers, using the photoelectric effect, as light-sensative elements inasmuch as they are considered to be much faster than either phototransistors or photoconductors. However, their relative bulk and the necessity of a great many conducting leads has made it impossible to incorporate a photomultiplier in the pen itself. For this reason, photomultipliers have been installed in a stationary device and connected to the pen by a light conducting device such as fiber glass optics which conduct light impringing on the pen to the stationary photomultiplier, the fiber glass optics allowing the pen to be moved to a particular loction of the screen where its action is required. However, this approach has certain disadvantages. In the first place, the flexibility of fiber glass optics is limited, and somewhat excessive strains may lead to some of the brittle fibers breaking. Furthermore, the circuitry involved with photomultiplier tubes is rather burdensome.

It would be of considerable advantage to utilize, within a light pen, a more compact photosensitive element, such as a phototransistor, to avoid the necessity of employing fiber glass optics.

Utilization of a photoresistive element, such as a cadmium sulfide cell, is unsatisfactory because its response speed is far below the requirements of most display devices. Phototransistors have a response speed well in excess of known photoresistors, but, on the other hand, when they are operated in the normal way, their response speed is for less than that of a photomultiplier tube. As a consequence, it has been considered that phototransistors could not be satisfactorily used in a light pen.

It is an initial object of the present invention to provide an improved light pen.

It is an additional object to provide circuit means enabling a phototransistor to be operated sufficiently fast to permit it to be suitably used in a light pen.

It is another object of the invention to provide a light pen capable of operating satisfactorily even in the presence of high ambient light levels.

In addition to the speed requirements of light pens, it is also important for the field of view of the light pen to be sharply defined for the operator. Accordingly, a significant feature of the preferred embodiment of the invention involves providing means for facilitating the operator's positioning of the pen.

Briefly, in accordance with the present invention, a light pen is provided having a phototransistor therein positioned so that light to be detected by the pen is incident on the transistor base. In order for the phototransistor to have a sufficiently fast response, it is forward biased to a moderate current level. The phototransistor is connected in a circuit which has a high AC gain and a low DC gain. As a consequence, the phototransistor is able to distinquish between a transient light signal (as would be caused by detection of the cathode ray beam light) and ambient conditions.

In order to facilitate the operator's positioning of the pen relative to the cathode ray tube screen, the pen includes a simple one-lens optical system which images the phototransistor on the screen. The field of view of the phototransistor is indicated on the screen by means of light reflected off the screen from bulbs disposed around the phototransistor.

As will be appreciated hereinafter, the present invention is directed primarily to the light pen, which provides a signal output in response to the detection of a transient light signal. A processing circuit responsive to the signal output is disclosed in U.S. patent application Ser. No. 594,105, filed on Nov. 14, 1966, by Roy P. Foerster and assigned to the same assignee as the present application.

Figure 2:
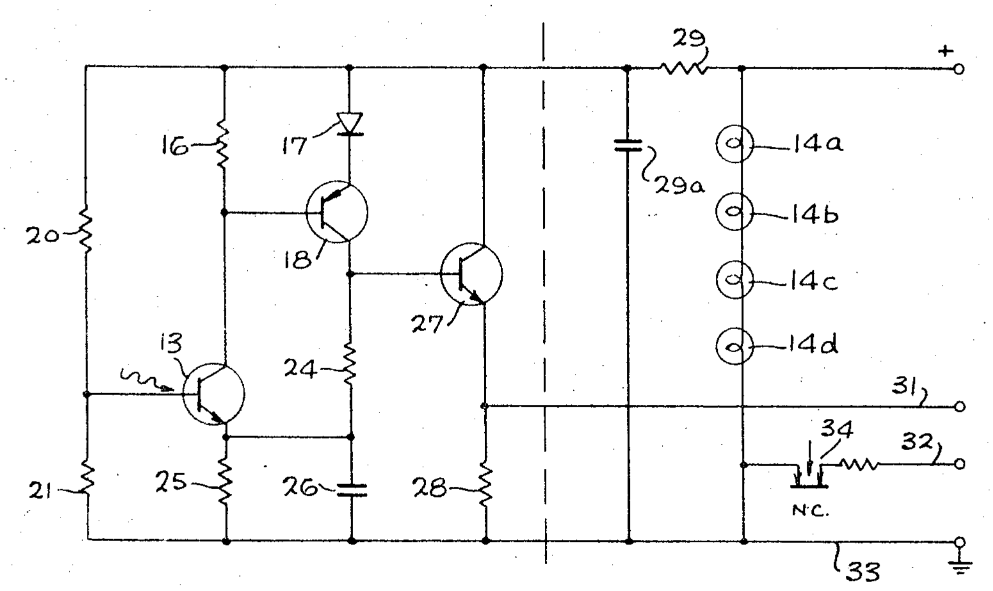

The novel features that are considered characteristic of this invention are set forth with particularity in the appended claims. The invention itself both as to its organization and method of operation, as well as additional objects and advantages thereof, will best be understood from the following description when read in connection with the accompanying drawing, in which:

FIGURE 1 is an enlarged fragmentary cross section of a preferred embodiment of the invention; and FIG. 2 is a circuit diagram showing the elements incorporated in the light pen of FIG. 1.

Attention is now called to FIG. 1, which illustrates a light pen 10 in accordance with the present invention. The pen 10 is primarily intended to be used in conjunction with a cathode ray tube display device (not shown) capable of presenting visual representations of data provided thereto by a digital computer (not shown), for example. Inasmuch as the persistence of cathode ray tubes is relatively short, the visual display is periodically refreshed by cyclically providing the data thereto. The pen 10 is utilized to enable an operator to identify a particular displayed element or symbol to the computer. This is done by enabling the pen 10 to sense the transient light provided by the cathode ray beam in tracing that symbol and providing an output pulse in response thereto. The time occurrence of that output pulse relative to the display cycle identifies the data corresponding to the selected displayed symbol.

As shown in FIG. 1, there is provided a shell 11 in the form of a tube, having mounted therein at its front opening a lens 12. More rearwardly in the tube 11 there is mounted a phototransistor 13 having a sensitive base surface disposed toward the lens. Surrounding the phototransistor are four miniature lamps **14*a*, 14*b*, 14*c*, and 14*d* (shown in FIG. 2; two of them, 14*a* and 14*c*, shown in FIG. 1) capable of producing four light spots in the plane of the phototransistor 13 through four light conducting rods 15*a*, 15*b*, 15*c*, and 15*d* associated with the lamps 14*a*, 14*b*, 14*c*, and 14*d*, respectively. Only two of the light conducting rods 15*a* and 15*c* are shown in FIG. 1. Preferably, the front ends of the light conducting rods may be roughened or frosted so as to simulate light sources that are substantially coplanar with the sensitive surface of the phototransistor. With the arrangement shown, it is possible to project a real image of the frontal surfaces of the light conductive rods 15 upon the cathode ray screen (not shown). The images of these surfaces then appear visibly on the screen, and, when they appear sharp, the image appearing on the screen of the trace is also focused on the front surface of the phototransistor 13. It has been found practical to maintain the distance between the phototransistor 13 and the front faces of the rods 15 at about twice the focal length, causing a focused image to appear at this same distance forwardly of the lens. However, the distance at which the light pen is being held from the cathode ray tube screen is not too critical, and good signals can be obtained with the light pen being held at distances somewhat more or less than the theoretically most favorable distance. However, the image formed from the light emitting front surfaces of the rods 15** causes four spaced spots to appear on the cathode ray tube, making it possible to exactly locate, at the center of these spots, the area where the appearance of a trace will cause a signal to be formed by the light-sensitive area of the phototransistor. This will even work when the cathode ray screen surface is not exactly in focus.

As shown in FIG. 2, the collector of transistor 13 is connected to a source of positive potential through a resistor 16, and the emitter of transistor 13 is connected to a ground lead 33 through a resistor 25. Normally, in a phototransistor arrangement, the base of transistor 13 is not connected, and the conduction along the collector-emitter path is therefore entirely dependent upon the impingement of light (photons) on the base-emitter area. In such an arrangement, the phototransistor response time is too slow for light pen applications. In accordance with one aspect of the present invention, the phototransistor is caused to respond faster by forward biasing it such that a current normally flows in the collector-emitter path. As a consequence, any photons impinging upon the base cause an output current to change faster than in the case of no biasing. Resistors 20 and 21, having their junction connected to the base of transistor 13, are connected in series between the source of positive potential and ground lead 33. As a consequence, base current flows, which in turn causes current flow along the collector-emitter path. As will be better understood hereinafter, the phototransistor is connected in a circuit having high AC and low DC gain. Accordingly, inasmuch as the bias current (and ambient light, for example) results in an effective DC signal, and since detection of the cathode ray beam light results in a pulse (essentially AC), the time of impingement of the cathode ray beam light on the transistor 13 base can be determined.

The circuitry housed in the shell 11 of the light pen 10 involves a second amplifier stage incorporating a PNP transistor 18 having its emitter connected through a diode 17 to the source of positive potential and its collector through a resistor 24 to the junction of a capacitor 26 and the resistor 25. The output signal from this second amplifier stage is taken from the collector of transistor 18. The diode maintains the emitter at a suitable operating voltage.

Transistor 18 has in its collector load circuit the resistor 24 in series with the parallel combination of resistor 25 and capacitor 26. The junction between resistor 24 and 25 is also connected to the emitter of transistor 13. Obviously, this is a negative feedback arrangement. Increase of current in the emitter-collector path of transistor 13 leads to a voltage drop across resistor 16 and a relative lowering of the base voltage of PNP transistor 18 with respect to the emitter, which increases the collector current, in turn increasing the voltage drop across resistor 25, which raises the potential of the emitter of transistor 13 and decreases the collector current of said transistor. However, resistor 25 is in parallel with capacitor 26. As this capacitor is a low impedance for alternating current, the negative feedback is reduced for variable signals so that the output signals of a variable character appear mainly across resistor 24. By a judicious choice of the various circuit elements, the direct current or more slowly varying components of the output signal can be suitably attenuated, while retaining the more quickly varying signal components. Thus, it should be appreciated that the circuit of FIG. 2 has a relatively high AC gain and a selectively low DC gain.

The otherwise damaging effect of the direct current bias superimposed across the variable signal by the forward base current injected in the system by bias resistors 20 and 21 can be substantially minimized by the feedback circuit described. The value of capacitor 26 is so chosen that the signal itself, caused by the appearance of a trace on the cathode ray screen, is not unduly attenuated.

The collector of transistor 18 is connected to the base of NPN transistor 27 having a resistor 28 connected between its emitter and ground. Thus, transistor 27 is an emitter follower that reduces the output impedance of the amplifying stages including transistors 13 and 18. The signal that appears between the emitter of transistor 27 and ground lead 33 has a sufficiently low output impedance so as to make shielding of the output lead 31 between the light pen, which houses all the circuitry shown in FIG. 2, and a stationary signal handling device (not shown) unnecessary.

A capacitor **29*a* and a resistor 29 may be provided to smooth out any voltage transients appearing on the supply for transistors 13, 18, and 27.**

Lamps **14*a*, 14*b*, 14*c*, and 14*d*, which as previously mentioned are also housed in the light pen shell 11, are connected in series between the source of positive potential and ground 33.**

The light pen also includes a normally closed switch 34 which grounds a line 32. This switch 34 operates upon a stationary signal handling device to which the pen is connected by a flexible cord, so as to make a light signal ineffective upon the signal handling elements. Opening the switch 34 by a push button on the pen (not shown) causes the signals appearing on signal lead 31 to be accepted and processed by the stationary signal handling device. The two supply lines, the output signal line 31, and the "enable" line 32 can be conveniently included in a highly flexible cable between the stationary device and the light pen itself.

Whereas a preferred embodiment has been described so as to facilitate the understanding of the invention, the invention itself is considered to be defined in and by the following claims.

I claim:

1. A light-sensitive device for generating a signal in response to a recurrent light signal, comprising:

a transistor having an emitter, a base, and a collector, means mounting said transistor for exposing its base-emitter junction to said light signal;

a voltage source;

impedance means connecting said voltage source across the emitter-collector path of said transistor;

voltage divider means connected across said voltage source;

tap means connecting said voltage divider means to the base of said transistor for supplying forward base current thereto, said base current producing a current in the emitter-collector path of said transistor in the same direction as current produced in said path in response to light impinging upon the base-emitter junction of said transistor; and circuit means for indicating variations in the current along the emitter-collector path of said transistors.

2. The device as defined in claim 1 wherein said circuit means includes a second transistor receiving a signal from the collector of said first transistor; and feedback means operating between the output of said second transistor and the emitter of said first transistor so as to substantially reduce the overall direct current and low frequency voltage gain of the first and second transistors.

3. A light sensing apparatus comprising:

a tubular housing having an open first end;

a lens disposed in said housing adjacent to said first end;

a phototransistor having an emitter, a base, and a collector;

means supporting said phototransistor in said housing with the base-emitter junction thereof disposed along the axis of said housing and substantially adjacent to said lens and spaced from said housing first end by at least the axial dimension of said lens;

a source of electrical potential;

an impedance means connecting said potential source across the emitter-collector path of said phototransistor;

voltage divider means connected across said potential source;

tap means connecting said voltage divider means to the base of said transistor for supplying forward base current thereto, said base current producing a current in the emitter-collector path of said transistor in the same direction as current produced in said path in response to light impinging upon the base-emitter junction of said transistor; and circuit means coupled to said phototransistor collector exhibiting a relatively high AC gain and a relatively low DC gain.

4. The light sensing apparatus of claim 3 wherein said circuit means includes;

a second transistor having an emitter, a base, and a collector;

impedance means connecting the emitter-collector path of said second transistor across said potential source;

means connecting said phototransistor collector to said second transistor base;

capacitor means connected in series with the emitter-collector path of said second transistor; and means coupling said capacitor means to said phototransistor emitter to reduce the gain of said phototransistor as said capacitor means charges.

5. The light sensing apparatus of claim 4 including means for slowly discharging said capacitor means.

6. The light sensitive means of claim 3 including a plurality of light sources mounted in said housing radially outwardly from the perimeter of said phototransistor and substantially adjacent to said lens for projecting light through said lens and out of said housing through said open first end.

References Cited

UNITED STATES PATENTS

| | | | |
|---|---|---|---|
| 2,948,815 | 8/1960 | Willems et al. | |
| 3,304,431 | 2/1967 | Biard et al. | |
| 3,305,689 | 2/1967 | Leavy et al. | 250—227 |
| 3,324,297 | 6/1967 | Stieltjes et al. | |
| 3,334,236 | 8/1967 | Bacon | 250—227 |

FOREIGN PATENTS

| | | |
|---|---|---|
| 1,185,956 | 1/1965 | Germany. |

RALPH G. NILSON, Primary Examiner

C. M. LEEDOM, Assistant Examiner

U.S. Cl. X.R.

250—227; 307—311